United States Patent
Meyer et al.

(10) Patent No.: US 9,669,610 B2
(45) Date of Patent: Jun. 6, 2017

(54) USE OF AQUEOUS POLYURETHANE DISPERSIONS FOR LAMINATING MOLDED ARTICLES

(71) Applicant: BASF SE, Ludwigshafen (DE)

(72) Inventors: Axel Meyer, Heidelberg (DE); Karl-Heinz Schumacher, Neustadt (DE); Oliver Hartz, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 62 days.

(21) Appl. No.: 14/431,439

(22) PCT Filed: Oct. 23, 2013

(86) PCT No.: PCT/EP2013/072168
§ 371 (c)(1),
(2) Date: Mar. 26, 2015

(87) PCT Pub. No.: WO2014/067833
PCT Pub. Date: May 8, 2014

(65) Prior Publication Data
US 2015/0239222 A1    Aug. 27, 2015

Related U.S. Application Data

(60) Provisional application No. 61/721,518, filed on Nov. 2, 2012.

(30) Foreign Application Priority Data

Nov. 2, 2012  (EP) ..................... 12191045

(51) Int. Cl.

| | |
|---|---|
| B32B 37/12 | (2006.01) |
| C09J 175/06 | (2006.01) |
| B32B 27/32 | (2006.01) |
| B32B 7/12 | (2006.01) |
| B32B 27/30 | (2006.01) |
| C08G 18/66 | (2006.01) |
| C08G 18/72 | (2006.01) |
| C08G 63/181 | (2006.01) |
| C08G 64/02 | (2006.01) |
| C08G 18/08 | (2006.01) |
| C08G 18/22 | (2006.01) |
| C08G 18/42 | (2006.01) |
| C08G 18/44 | (2006.01) |
| C08G 18/12 | (2006.01) |
| C08G 18/32 | (2006.01) |
| C08G 18/40 | (2006.01) |

(52) U.S. Cl.
CPC .............. *B32B 37/12* (2013.01); *B32B 7/12* (2013.01); *B32B 27/304* (2013.01); *B32B 27/32* (2013.01); *C08G 18/0819* (2013.01); *C08G 18/0828* (2013.01); *C08G 18/12* (2013.01); *C08G 18/222* (2013.01); *C08G 18/3206* (2013.01); *C08G 18/4009* (2013.01); *C08G 18/4216* (2013.01); *C08G 18/44* (2013.01); *C08G 18/664* (2013.01); *C08G 18/722* (2013.01); *C08G 63/181* (2013.01); *C08G 64/0208* (2013.01); *C09J 175/06* (2013.01); *B32B 2255/10* (2013.01); *B32B 2479/00* (2013.01); *B32B 2605/08* (2013.01); *C08G 2170/80* (2013.01); *Y10T 428/3158* (2015.04); *Y10T 428/31551* (2015.04); *Y10T 428/31573* (2015.04)

(58) Field of Classification Search
CPC  C08G 18/0819; C08G 18/0828; C08G 18/12; C08G 18/222; C08G 18/3206; C08G 18/3857; C08G 18/4009; C08G 18/4216; C08G 18/44; C08G 18/664; C08G 18/722; C08G 2170/80; C08G 63/181; C08G 64/0208; C09J 175/06; B32B 2255/103; B32B 2479/00; B32B 2605/08; B32B 27/304; B32B 27/32; B32B 37/12; B32B 7/12; Y10T 428/31551; Y10T 428/31573; Y10T 428/3158; B05D 1/00; B05D 1/02
USPC .................. 428/423.1, 424.6, 424.8; 528/44; 156/60, 307.3, 327

See application file for complete search history.

(56) References Cited

U.S. PATENT DOCUMENTS

| | | |
|---|---|---|
| 3,412,054 A | 11/1968 | Milligan et al. |
| 4,192,937 A | 3/1980 | Noll et al. |
| 4,269,748 A | 5/1981 | Nachtkamp et al. |
| 4,292,226 A | 9/1981 | Wenzel et al. |
| 6,713,184 B1* | 3/2004 | Ferencz .................. B32B 7/12 156/332 |
| 9,005,762 B2 | 4/2015 | Meyer et al. |
| 2008/0280145 A1* | 11/2008 | Paschkowski .......... B29C 66/45 428/412 |
| 2012/0021213 A1* | 1/2012 | Hartz ................. C08G 18/0823 428/343 |

FOREIGN PATENT DOCUMENTS

| | | |
|---|---|---|
| CA | 1 129 128 A | 8/1982 |
| DE | 10 2007 052 966 A1 | 5/2009 |
| EP | 2 090 603 A2 | 8/2009 |
| WO | WO 2009/055696 A1 | 4/2009 |
| WO | WO 2009/055697 A1 | 4/2009 |
| WO | WO 2013/083456 A1 | 6/2013 |

OTHER PUBLICATIONS

International Search Report issued Apr. 24, 2014 in PCT/EP2013/072168.

* cited by examiner

*Primary Examiner* — Thao T Tran
(74) *Attorney, Agent, or Firm* — Oblon, McClelland, Maier & Neustadt, L.L.P.

(57) ABSTRACT

The use of aqueous polyurethane dispersions is described for the lamination of moldings, where the polyurethane comprises units derived from at least one amorphous polyester polyol and comprises units derived from at least one polycarbonate.

23 Claims, No Drawings

USE OF AQUEOUS POLYURETHANE DISPERSIONS FOR LAMINATING MOLDED ARTICLES

The invention relates to the use of aqueous polyurethane dispersions for the lamination of moldings, where the polyurethane is composed of amorphous polyester polyols, and also of polycarbonate polyols. The invention also relates to a process for the production of laminated moldings, and also to the moldings produced by the process.

The use of adhesive bonding or lamination to coat moldings with foils is practiced not only in furniture production but also in the automobile interior sector. The process known as thermal activation is frequently used in this context. The adhesive systems used have to have good capability for thermal activation, and this means that adequate tack is produced when systems that have no, or only little, room-temperature tack are heated. For systems of this type it is firstly desirable that activation temperature is low, and not excessively above room temperature. Secondly, maximum heat resistance of the laminated molding is necessary, i.e. minimum subsequent separation of the laminated foil from the molding on exposure to relatively high temperatures.

Adhesive systems that can be used are inter alia aqueous polyurethane dispersions, as long as they comply with the requirements. The prior art includes the aqueous polyurethane dispersions described by way of example in WO 09/55696, WO 09/55697, and EP 2090603. The polyurethanes are generally composed of polyester diols, polyisocyanates, and aminic chain extenders.

Another technology that uses aqueous polyurethane dispersions is contact adhesive bonding. Whereas in industrial lamination by the thermal activation process only one side of the two substrates to be adhesive-bonded to one another is coated with adhesive, and the adhesive bonding takes place with simultaneous use of elevated temperature and of pressure, in contact adhesive bonding both sides of the substrates to be adhesive-bonded are coated with a self-adhesive, and the adhesive bonding takes place at room temperature with application of pressure, without any temperature increase. Industrial lamination by the thermal activation process generally achieves greater bond strength than contact adhesive bonding. However, if one of the two substrates is temperature-sensitive (an example being lamination of leather) it is necessary to resort to the contact adhesion process, despite the poorer bond strength associated therewith. Systems which exhibit the high bond strength of thermal activatable adhesives but where the activation temperature has been minimized (e.g. is below 60° C.) are therefore desirable in order to permit adhesive bonding of substrates including those that are heat-sensitive. However, despite the low activation temperature the adhesives should exhibit maximum heat resistance after the adhesive-bonding process, i.e. the adhesive bond should not separate on exposure to relatively high temperatures.

The room-temperature tack of the thermal activatable polyurethanes used hitherto for the lamination of moldings by the thermal activation process is moreover generally not adequate to permit extension of the use of said polyurethanes to the contact-adhesion process. Requirements for this would include not only activation temperature and heat resistance, which are important parameters for lamination, but also good contact tack or, respectively, high shear values after contact adhesive bonding.

The object consisted in developing aqueous adhesives which have minimized content of organic solvents and which can be used as lamination adhesives for the production of laminated moldings in thermal activation processes, have minimized activation temperatures, give laminated moldings with maximized heat resistance, and moreover also exhibit improved contact tack, so that the adhesives can be used in contact adhesion processes without any inappropriate impairment of the properties required for the use in the thermal activation process.

It has been found that the object can be achieved via use of the polyurethane dispersions described below (for which the abbreviated term adhesive is also used below). The invention provides the use of aqueous polyurethane dispersions for the lamination of moldings, where the polyurethane comprises units derived from at least one amorphous polyester polyol and comprises units derived from at least one polycarbonate.

The invention also provides a process for the production of laminated moldings, which comprises
a) providing a molding,
b) providing a foil,
c) providing an aqueous polyurethane dispersion described in more detail below, and
d) applying the aqueous polyurethane dispersion to the foil and/or to the molding, and laminating the foil to the molding, where the lamination process preferably takes place with thermal activation.

The invention also provides foil-laminated moldings produced by the process of the invention, where the foil material is preferably one selected from the group consisting of polyvinyl chloride, which can also comprise plasticizer, and thermoplastic polyolefin (TPO), and combinations thereof.

The adhesive to be used in the invention consists essentially of at least one water-dispersible polyurethane as polymeric binder, and optionally of additives, such as fillers, thickener, antifoam, etc. The polymeric binder preferably takes the form of a dispersion in water or else in a mixture of water and water-soluble organic solvents with boiling points that are preferably below 150° C. (1 bar). Particular preference is given to water as sole solvent. The water or other solvents are not included in the calculation for weight data relating to the composition of the adhesive.

Amorphous solids are those where the arrangement of the units does not generate crystal lattices, i.e. are non-crystalline solids. Amorphous polyester polyols in the invention are in particular those polyester polyols which in the temperature range −30° C. to +60° C. are not crystalline, i.e. do not have a melting point.

The polyurethane preferably comprises an amount of more than 10% by weight, or more than 25% by weight, particularly at least 30% by weight, based on the polyurethane, of units derived from one or more amorphous polyester diols.

The polyurethane preferably comprises an amount of more than 10% by weight, or more than 25% by weight, particularly at least 30% by weight, based on the polyurethane, of units derived from one or more polycarbonates.

The molar ratio of amorphous polyester polyol (a) to polycarbonate (b) is preferably in the range of 1:10 to 10:1, or of 1:5 to 5:1, in particular of 1:2 to 2:1.

It is preferable that the entire polyurethane consists essentially of:
a) at least one amorphous polyesterdiol with a molar mass of above 500 to 4000 g/mol,
b) at least one polycarbonate with a molar mass of above 500 to 4000 g/mol,
c) at least one organic diisocyanate or one mixture which is made of organic isocyanate compounds and which has an arithmetic-average NCO functionality of 1.9 to 2.3, preference being given to isophorone diisocyanate or hexamethylene diisocyanate, or a mixture thereof,
d) optionally at least one dihydric alcohol with an average molar mass of 62 to 500 g/mol, and
e) optionally at least one compound selected from the group consisting of mono- to trihydric alcohols which also comprise at least one ionic group or at least one group capable of conversion to an ionic group, and diamino compounds which also have at least one ionic group or at least one group capable of conversion to an ionic group, preferably selected from diaminocarboxylic acids, diaminosulfonic acids, and the respective carboxylic and sulfonic salts,
f) optionally further polyfunctional compounds which differ from the monomers (a) to (e) and which have reactive groups which involve alcoholic hydroxy groups, primary or secondary amino groups, or isocyanate groups, and
g) optionally monofunctional compounds which differ from the monomers (a) to (f) and which have a reactive group which involves an alcoholic hydroxy group, a primary or secondary amino group, or an isocyanate group.

An example of a group capable of conversion to an ionic group is an acid group, in particular a carboxylic acid group or a sulfonic acid group.

It is preferable that the entire polyurethane consists of:
a) 10 to 80% by weight of at least one amorphous polyesterdiol with a molar mass of above 500 to 4000 g/mol,
b) 10 to 80% by weight of at least one polycarbonate with a molar mass of above 500 to 4000 g/mol,
c) 5 to 30% by weight of at least one organic diisocyanate or one mixture which is made of organic isocyanate compounds and which has an arithmetic-average NCO functionality of 1.9 to 2.3,
d) 2 to 10% by weight of at least one dihydric alcohol with an average molar mass of 62 to 500 g/mol, and
e) 0 to 10% by weight, for example 2 to 10% by weight, of at least one compound selected from the group consisting of mono- to trihydric alcohols which also comprise at least one ionic group or at least one group capable of conversion to an ionic group, and diamino compounds which also have at least one ionic group or at least one group capable of conversion to an ionic group,
f) 0 to 5% by weight of further polyfunctional compounds which differ from the monomers (a) to (e) and which have reactive groups which involve alcoholic hydroxy groups, primary or secondary amino groups, or isocyanate groups, and
g) 0 to 5% by weight of monofunctional compounds which differ from the monomers (a) to (f) and which have a reactive group which involves an alcoholic hydroxy group, a primary or secondary amino group, or an isocyanate group.

The polycarbonates (b) involve compounds having free hydroxy groups, i.e. polyols, in particular diols. With a view to good film formation and elasticity, relatively high-molecular-weight diols which have a molar mass of above 500 to 4000 g/mol, preferably of about 1000 to 3000 g/mol, may especially be used as diols (a) and (b). The molar mass involved here is the number average Mn. Mn is obtained via determination of the number of terminal groups (OH number).

Component (a) used preferably comprises amorphous polyesterdiols which are obtained via reaction of dihydric alcohols with dibasic carboxylic acids. The polyester polyols can also be produced by using, instead of the free polycarboxylic acids, the corresponding polycarboxylic anhydrides or corresponding polycarboxylic esters of lower alcohols, or by using a mixture of these.

At least one polycarboxylic acid one aromatic dicarboxylic acid, in particular isophthalic acid, is preferably for the production of the amorphous polyesterdiol a). In one preferred embodiment, a mixture of carboxylic acids composed of at least one aliphatic dicarboxylic acid having 3 to 10, preferably 4 to 8, carbon atoms and of at least one aromatic dicarboxylic acid is used for the production of the amorphous polyesterdiol a). The (molar) mixing ratio is preferably 0.5:1 to 2:1. A preferred dicarboxylic acid mixture is adipic acid/isophthalic acid, in particular in a ratio of 0.5:1 to 2:1.

Examples of polyhydric alcohols that can be used for the production of the polyesterdiols a) and b) are ethylene glycol, 1,2-propanediol, 1,3-propanediol, 1,3-butanediol, 1,4-butenediol, 1,4-butynediol, 1,5-pentanediol, neopentyl glycol, bis(hydroxymethyl)cyclohexanes, such as 1,4-bis (hydroxymethyl)cyclohexane, 2-methyl-1,3-propanediol, methylpentanediols, and also diethylene glycol, triethylene glycol, tetraethylene glycol, polyethylene glycol, dipropylene glycol, polypropylene glycol, dibutylene glycol, and polybutylene glycols. Preference is given to alcohols of the general formula HO—$(CH_2)_x$—OH, where x is a number from 1 to 20, preferably an even number from 2 to 20. Examples here are ethylene glycol, 1,4-butanediol, 1,6-hexanediol, 1,8-octanediol, and 1,12-dodecanediol. Preference is further given to neopentyl glycol. It is preferable to use at least one alkanediol having 2 to 10, preferably 4 to 8, carbon atoms for the production of the amorphous polyesterdiols a).

It is preferable that the amorphous polyesterdiol is one produced from a mixture of at least one aliphatic dicarboxylic acid having 3 to 10, preferably 4 to 8, carbon atoms and at least one aromatic dicarboxylic acid in a ratio that is preferably 0.5:1 to 2:1, and at least one alkanediol having 2 to 10, preferably 4 to 8, carbon atoms. It is particularly preferable that the amorphous polyesterdiol is one produced from a dicarboxylic acid mixture of adipic acid/isophthalic acid, in particular in a (molar) ratio of 0.5:1 to 2:1, and 1,6-hexanediol. An example of a suitable commercial product is Lupraphen® VP9206.

The polycarbonates (b) preferably involve macrodiols, in particular polycarbonatediols such as those that can be obtained via reaction of phosgene with an excess of the low-molecular-weight alcohols mentioned as structural components for the polyester polyols. Examples of suitable compounds are alkanediol polycarbonates preferably having 2 to 10, in particular 4 to 8, carbon atoms in the alkane chain, e.g. ethylene glycol, 1,2-propanediol, 1,3-propanediol, 1,3-butanediol, 1,4-butenediol, 1,4-butynediol, 1,5-pentanediol, neopentyl glycol, bis(hydroxymethyl)cyclohexanes, such as 1,4-bis(hydroxymethyl)cyclohexane, 2-methyl-1,3-propanediol, methylpentanediols, and also diethylene glycol, triethylene glycol, tetraethylene glycol, polyethylene glycol, dipropylene glycol, polypropylene glycol, dibutylene glycol, and polybutylene glycols. Preference is given to alcohols of the general formula HO—$(CH_2)_x$—OH, where x is a number from 1 to 20, preferably an even number from 2 to 20. Examples here are ethylene glycol, 1,4-butanediol, 1,6-hexanediol, 1,8-octanediol, and 1,12-dodecanediol. Preference is further given to neopentyl glycol. It is preferable to use at least one alkanediol having 2 to 10, preferably 4 to 8, carbon atoms for the production of the polycarbonates (b), and the polycarbonate preferably involves a hydroxy-terminated polycarbonate.

Optional additional components f) used can also comprise lactone-based polyesterdiols, where these involve homo- or copolymers of lactones, preference being given to involvement of adducts of lactones onto suitable difunctional starter molecules, where the adducts have terminal hydroxy groups. Lactones that can preferably be used are those deriving from compounds of the general formula HO—(CH$_2$)$_z$—COOH, where z is a number from 1 to 20, and an H atom of a methylene unit can also have been substituted by a C$_1$-C$_4$-alkyl moiety. Examples are epsilon-caprolactone, β-propiolactone, gamma-butyrolactone. and/or methyl-epsilon-caprolactone, and also mixtures of these. Examples of suitable starter components are the low-molecular-weight dihydric alcohols mentioned above as structural component for the polyester polyols. Particular preference is given to the corresponding polymers of epsilon-caprolactone. Lower polyesterdiols or polyetherdiols can also have been used as starters for the production of the lactone polymers. It is also possible to use, instead of the polymers of lactones, the corresponding, chemically equivalent polycondensates of the hydroxycarboxylic acids that correspond to the lactones.

Optional additional components f) used concomitantly can also comprise polyetherdiols. Polyetherdiols are in particular obtainable via homopolymerization of ethylene oxide, propylene oxide, butylene oxide, tetrahydrofuran, styrene oxide or epichlorohydrin, e.g. in the presence of BF$_3$, or via an addition reaction of these compounds optionally in a mixture or in succession onto starter components having reactive hydrogen atoms, for example alcohols or amines, e.g. water, ethylene glycol, 1,2-propanediol, 1,3-propanediol, 2,2-bis(4-hydroxyphenyl)propane. or aniline. Examples of polyetherdiols are polypropylene oxide and polytetrahydrofuran having a number-average molar mass of 240 to 5000 g/mol and especially 500 to 4500 g/mol. Polytetrahydrofuran is a polyetherdiol particularly preferred as structural component for the polyurethanes.

Optional additional components f) used concomitantly can also comprise polyhydroxyolefins, preferably those having 2 terminal hydroxy groups, e.g. α,ω-dihydroxypolybutadiene, α,ω-dihydroxypolymethacrylate, or α,ω-dihydroxypolyacrylate. Other suitable polyols are polyacetals, polysiloxanes, and alkyd resins.

Organic diisocyanates c) that can be used are both aliphatic and aromatic diisocyanates. Particular mention may be made of diisocyanates of the general formula X(NCO)$_2$, where X is an aliphatic hydrocarbon moiety having from 4 to 15 carbon atoms, a cycloaliphatic or aromatic hydrocarbon moiety having from 6 to 15 carbon atoms, or an araliphatic hydrocarbon moiety having from 7 to 15 carbon atoms. Examples of diisocyanates of this type are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI), for example the trans/trans isomer, the cis/cis isomer, and the cis/trans isomer, and also mixtures composed of said compounds. Diisocyanates of this type are available commercially. Particularly important mixtures of these isocyanates are the mixtures of the respective structural isomers of diisocyanatotoluene and diisocyanatodiphenylmethane, and in particular the mixture of 80 mol % of 2,4-diisocyanatotoluene and 20 mol % of 2,6-diisocyanatotoluene is suitable. The mixtures of aromatic isocyanates such as 2,4-diisocyanatotoluene and/or 2,6-diisocyanatotoluene with aliphatic or cycloaliphatic isocyanates, such as hexamethylene diisocyanate or IPDI, are moreover particularly advantageous, and the preferred molar mixing ratio of the aliphatic isocyanates to aromatic isocyanates here is 4:1 to 1:4. The structure of the polyurethanes can also use, as compounds other than the abovementioned compounds, isocyanates which bear further capped isocyanate groups, e.g. uretdione groups, alongside the free isocyanate groups. It is particularly preferable that the amorphous polyurethane is composed of organic diisocyanates selected from isophorone diisocyanate, hexamethylene diisocyanate, and a mixture of isophorone diisocyanate and hexamethylene diisocyanate.

Compounds of component e) comprise in particular anionic groups, such as the sulfonate group, the carboxylate group, or the phosphate group. The expression ionic group is also intended to comprise those groups that are capable of conversion to ionic groups. Accordingly, the carboxylic acid group, sulfonic acid group, and phosphoric acid group, which are capable of conversion to ionic groups via neutralization, are also considered to be ionic groups. Preference is given to the following as compound e): dihydroxycarboxylic acids, diaminocarboxylic acids, and diaminosulfonic acids, and the respective carboxylic and sulfonic salts of these.

It is usually possible to use aliphatic, cycloaliphatic, araliphatic, or aromatic carboxylic acids and sulfonic acids which bear at least one alcoholic hydroxy group. Preference is given to dihydroxycarboxylic acids, in particular dihydroxyalkylcarboxylic acids, especially having from 3 to 10 carbon atoms, as also described in U.S. Pat. No. 3,412,054. Particular preference is given to compounds of the general formula

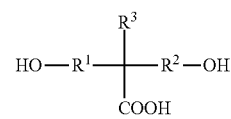

in which R$^1$ and R$^2$ are a C$_1$-C$_4$-alkanediyl(unit), and R$^3$ is a C$_1$-C$_4$-alkyl(unit), and particular preference is especially given to dimethylolpropionic acid (DMPA).

Further monomers having hydrophilic groups, e.g. corresponding dihydroxysulfonic acids and dihydroxyphosphonic acids, for example 2,3-dihydroxypropanephosphonic acid, or diaminosulfonic acids, can be used alongside the bifunctional carboxylic acids. Particular preference is given to N-(2-aminoethyl)-2-aminoethylsulfonic acid and to the corresponding sulfonate salts.

Insofar as monomers having potentially ionic groups are used, conversion of these to the ionic form can take place prior to or during, but preferably after, the isocyanate polyaddition reaction, since the ionic monomers often are only sparingly soluble in the reaction mixture. It is particularly preferable that the carboxylate groups or sulfonate groups take the form of their salts with an alkali metal ion or with an ammonium ion as counterion. Conversion of potentially anionic groups, e.g. carboxylic acid groups or sulfonic acid groups, into ionic groups can be achieved by using conventional inorganic or organic bases, such as KOH, NaOH, ammonia, or alkylamines, e.g. trialkylamines.

The hardness and the modulus of elasticity of the polyurethanes can be increased by using, as additional diols, dihydric alcohols d) with a molar mass of about 62 to 500 g/mol, preferably 62 to 400 g/mol or 62 to 200 g/mol, preferably in an amount of 2 to 10% by weight, based on the polyurethane. Monomers d) used are especially the structural components represented by the short-chain alkanediols mentioned for the production of polyester polyols, preference being given here to the unbranched diols having from 2 to 12 carbon atoms and having an even number of carbon atoms, and also 1,5-pentanediol and neopentyl glycol. Examples of diols d) that can be used are ethylene glycol, 1,2-propanediol, 1,3-propanediol, 1,3-butanediol, 1,4-butanediol, 1,4-butenediol, 1,4-butynediol, 1,5-pentanediol, neopentyl glycol, bis(hydroxymethyl)cyclohexanes such as 1,4-bis(hydroxymethyl)cyclohexane, 2-methyl-1,3-propanediol, methylpentanediols, and also diethylene glycol, triethylene glycol, tetraethylene glycol, polyethylene glycol, dipropylene glycol, polypropylene glycol, dibutylene glycol, and polybutylene glycols. Preference is given to alcohols of the general formula HO—$(CH_2)_x$—OH, where x is a number from 1 to 20, preferably an even number from 2 to 20. Examples here are ethylene glycol, 1,4-butanediol, 1,6-hexanediol, 1,8-octanediol, and 1,12-dodecanediol. Particular preference is given to 1,4-butanediol and neopentyl glycol.

The proportion of the diols a) and b) in the polyurethanes, based on the total amount of all of the diols, is preferably from 10 to 100 mol % or from 60 to 100 mol %, and the proportion of the diols d), based on the total amount of the diols, is preferably from 0 to 90 mol %, or from 0 to 40 mol %.

The monomers (f) which differ from the monomers (a) to (e) and which are optionally also constituents for the polyurethane generally serve for crosslinking or for chain extension. They are generally nonphenolic alcohols of functionality higher than two, amines having 2 or more primary and/or secondary amino groups, or else compounds which bear not only one or more alcoholic hydroxy groups but also one or more primary and/or secondary amino groups. Examples of alcohols with functionality higher than two which can serve to establish a certain degree of branching or of crosslinking are trimethylolpropane, glycerol, and sugars. It is also possible to use monoalcohols which bear not only the hydroxy group but also another group reactive toward isocyanates, for example monoalcohols having one or more primary and/or secondary amino groups, e.g. monoethanolamine.

Polyamines having 2 or more primary and/or secondary amino groups are especially used when the chain extension or crosslinking is intended to take place in the presence of water, since amines generally react more rapidly than alcohols or water with isocyanates. This is often a requirement when aqueous dispersions of crosslinked polyurethanes or of polyurethanes with high molecular weight are desired. The procedure in cases of this type is that prepolymers having isocyanate groups are produced, and these are rapidly dispersed in water and then are chain-extended or crosslinked via addition of compounds having a plurality of amino groups reactive toward isocyanates. Amines suitable for this purpose are generally polyfunctional amines in the molar mass range from 32 to 500 g/mol, preferably from 60 to 300 g/mol, which comprise at least two amino groups selected from the group of the primary and secondary amino groups. Examples here are diamines, such as diaminoethane, diaminopropanes, diaminobutanes, diaminohexanes, piperazine, 2,5-dimethylpiperazine, amino-3-amino-methyl-3,5,5-trimethylcyclohexane (isophoronediamine, IPDA), 4,4'-diaminodicyclohexyl-methane, 1,4-diaminocyclohexane, aminoethylethanolamine, hydrazine, hydrazine hydrate, and triamines, such as diethylenetriamine and 1,8-diamino-4-aminomethyloctane.

The amines can also be used in blocked form, e.g. in the form of the corresponding ketimines (see by way of example CA-A 1 129 128), ketazines (cf. by way of example U.S. Pat. No. 4,269,748), or amine salts (see U.S. Pat. No. 4,292,226). Other capped polyamines which can be used for the chain extension of the prepolymers for the production of the polyurethanes of the invention are oxazolidines as used by way of example in U.S. Pat. No. 4,192,937. When capped polyamines of this type are used, they are generally mixed with the prepolymers in the absence of water, and this mixture is then mixed with the dispersion water or with a portion of the dispersion water, thus liberating the corresponding polyamines by hydrolysis.

It is preferable to use mixtures of di- and triamines, and it is particularly preferable to use mixtures of isophoronediamine (IPDA) and diethylenetriamine (DETA).

The polyurethanes preferably comprise, as component (f), from 1 to 30 mol %, particularly from 4 to 25 mol %, based on the total amount of all of the polyfunctional compounds reactive toward isocyanate, of at least one polyamine having at least 2 amino groups reactive toward isocyanates. Other monomers (f) that can be used for the same purpose are isocyanates of functionality higher than two. Examples of compounds available commercially are the isocyanurate or the biuret of hexamethylene diisocyanate.

Monomers (g) which can optionally be used concomitantly are monoisocyanates, monoalcohols, and monoprimary and -secondary amines. The proportion of these is generally at most 10 mol %, based on the total molar amount of the monomers. These monofunctional compounds usually bear further functional groups, for example olefinic groups or carbonyl groups, and serve to introduce, into the polyurethane, functional groups which permit dispersion or crosslinking, or further polymer-analogous reaction of the polyurethane. Examples of monomers that can be used for this purpose are isopropenyl-alpha,alpha-dimethylbenzyl isocyanate (TMI) and esters of acrylic or methacrylic acid, for example hydroxyethyl acrylate or hydroxyethyl methacrylate.

Adhesives with a particularly good property profile are obtained especially when diisocyanates (c) used are in essence only aliphatic diisocyanates, cycloaliphatic diisocyanates, or araliphatic diisocyanates. Alkali metal salts of diaminomonosulfonic acid is an excellent supplementary component (e) for this monomer combination; the Na salt is most suitable here.

Methods for adjusting the molecular weight of the polyurethanes via selection of the proportions of the monomers reacting with one another, and also the arithmetic average of the number of reactive functional groups per molecule, are well known in the field of polyurethane chemistry. Components (a) to (g), and also the respective molar amounts of these, are normally selected in such a way that the quotient calculated from the entirety of all of the NCO groups and from the entirety of all of the NCO-reactive OH groups, i.e. the A:B ratio, where A is the molar amount of isocyanate groups and
B is the sum of the molar amount of hydroxy groups and of the molar amount of the functional groups that can react with isocyanates in an addition reaction, is 0.5:1 to 2:1, preferably 0.7:1 to 1.5:1, or 0.8:1 to 1.3:1 particularly preferably 0.9:1 to 1.2:1. It is very particularly preferable that the A:B ratio is as close as possible to 1:1.

The monomers (a) to (g) used usually bear an average of from 1.5 to 2.5, preferably from 1.9 to 2.1, particularly preferably 2.0, isocyanate groups and, respectively, functional groups which can react with isocyanates in an addition reaction.

The polyaddition of the structural components for the production of the polyurethane preferably takes place at reaction temperatures of up to 180° C., with preference up to 150° C. at atmospheric pressure or under autogenous pressure. The production of polyurethanes and of aqueous polyurethane dispersions is known to the person skilled in the art. The polyurethanes preferably take the form of aqueous dispersions and are used in this form. The pH of the polymer dispersion is preferably adjusted to be above 5, in particular to be between 5.5 and 8.5.

The adhesive to be used in the invention comprises acid groups or other reactive groups which can react in a crosslinking reaction with one another or with external crosslinking agents. The amount present of these reactive groups is preferably from 0.0001 to 0.5 mol/100 g of adhesive, particularly preferably from 0.0005 to 0.5 mol/100 g of adhesive. Carboxy groups are also formed via saponification reactions, and crosslinking can therefore also occur without any initial content of carboxy groups in the polyurethane.

In one embodiment of the invention, the polyurethane dispersion adhesive comprises at least one external crosslinking agent. Examples of suitable crosslinking agents are polyisocyanates having at least two isocyanate groups, e.g. isocyanurates formed from diisocyanates, other examples being compounds having at least one carbodiimide group, chemically blocked isocyanates, encapsulated isocyanates, encapsulated uretdiones, biurets, or allophanates. Other suitable compounds are aziridines, oxazolines, and epoxides. Particular preference is given to aliphatic polyisocyanates, in particular water-emulsifiable polyisocyanates, e.g. Basonat® LR9056. The amount used of the external crosslinking agent is preferably from 0.5 to 10% by weight, based on solids content of the dispersion. An external crosslinking agent is a compound which has not been bonded to the polyurethane prior to the crosslinking reaction but instead has been dispersed or dissolved in the polyurethane dispersion. However, it is also possible to use crosslinking agents that have been bonded to the polyurethane (internal crosslinking agents). In one embodiment, the polyurethane dispersion is used in the form of two-component adhesive composition together with at least one polyisocyanate compound.

The invention uses the polyurethane dispersions of the invention in aqueous adhesive preparations for the production of laminated moldings, i.e. for the production of composite products via long lasting adhesive bonding of flexible foils of large surface area on solid (three-dimensionally shaped, dimensionally stable, non-flexible) moldings as substrate. The flexible foils are in particular those selected from polymer foils and metal foils. They are adhesive-bonded to the solid moldings, e.g. moldings made of metal, of coated metal, of wood or timber materials, of fiber materials, or plastic. The moldings can involve furniture or furniture components, i.e. constituents of furniture, or can involve automobile-interior components.

The present invention therefore also provides a process for the production of foil-laminated moldings by providing an aqueous polyurethane dispersion described above. With or without modification with conventional auxiliaries, the aqueous polymer dispersions here can be used as aqueous adhesive preparations. Examples of conventional auxiliaries are wetting agents, thickeners, protective colloids, light stabilizers, biocides, antifoams, etc. The adhesive preparations of the invention require no addition of plasticizing resins (tackifiers) or of other plasticizers. The polyurethane dispersions of the invention can also be blended with other types of polymer dispersion for use in the invention, in particular with polyacrylate dispersions, polyvinyl acetate dispersions, and polyethylene-vinyl acetate dispersions. Among these blending dispersions, preference is given to polyethylene-vinyl acetate dispersions. Typical quantitative ratios by weight of polyurethane dispersion to blending dispersion are in the range 3:1 to 1:2 (based in each case on solids content).

In one embodiment, the polymer dispersion of the invention is used as single-component composition, i.e. without additional crosslinking agents, in particular without isocyanate crosslinking agent. However, the polymer dispersion of the invention can also be used in the form of two-component adhesive in which a crosslinking component, e.g. a water-emulsifiable isocyanate, is added. At least one of the substrates can have been metallized or printed on the side coated with the adhesive.

The invention also provides a process for the production of laminated moldings, which comprises
a) providing a molding,
b) providing a foil,
c) providing an aqueous polyurethane dispersion according to any of the preceding claims, and
d) applying the aqueous polyurethane dispersion to the foil and/or to the molding, and laminating the foil to the molding.

The lamination process preferably takes place under pressure and/or at elevated temperature, in particular via thermal activation.

In one embodiment, the laminated moldings involve foil-coated furniture. The foil-coated furniture produced in the invention involves composite products. The composite products can also comprise primer layers for improvement of adhesion between foil and adhesive layer and/or between substrate and adhesive layer. The substrates and foils to be adhesive-bonded can have been pretreated with adhesive promoters. However, the use of primers is not absolutely essential, because the adhesives of the invention intrinsically have good adhesion properties.

The invention also provides a process for the production of foil-laminated moldings for automobile construction, where
a) an adhesive composition described above of the invention, a polymer foil, and a molding provided by way of example for incorporation into an automobile are provided,
b) the adhesive composition is applied to the polymer foil and/or to the molding, and
c) then the polymer foil is adhesive-bonded to the molding under pressure and/or at elevated temperature.

The moldings can also involve moldings composed of synthetic or natural fibers or of particles which are a byproduct of cutting processes, where these have been bonded via a binder to give a molding; moldings made of plastic, e.g. ABS, are in particular also suitable. The moldings can have any desired form.

Particularly preferred foils are polymer foils. Polymer foil in particular means flexible plastics sheets of thickness 0.05 millimeter to 5 millimeters, preferably 0.25 to 1 mm, which can be rolled up. This therefore includes not only "foils" in the strict sense of thicknesses below 1 mm but also the type of protective sealing sheet typically used for the protective sealing of tunnels, roofs, or swimming pools with a thickness that is typically 1 to 3 mm, or even in specific instances with a thickness up to at most 5 mm. Plastics foils of this type are usually produced via spreading, casting, extrusion, or particularly preferably calendering, and are typically available commercially in rolls or are produced in situ. They can have a single- or multilayer structure. The plastic of the polymer foils is preferably a thermoplastic, e.g. polyester, such as polyethylene terephthalate (PET), thermoplastic polyolefins (TPO), such as polyethylene, oriented polypropylene (OPP), unstretched polypropylene (CPP), polyvinyl chloride, in particular flexible PVC, polyacetates, ethylene/vinyl acetate copolymers (EVA),
ASA (acrylonitrile/styrene/acrylate copolymers), PUR (polyurethane), PA (polyamide), poly(meth)acrylates, polycarbonates, or plastics alloys of these, cellophane, metal-coated, e.g. aluminum-coated, (metallized) polymer foils (abbreviated to: metalized foils), or metal foils, e.g. made of aluminum. The foils mentioned can by way of example also have been printed with printing inks. Particular preference is given to rigid PVC and to thermoplastic polyethylene terephthalate (PET).

The furniture components can also involve moldings which are composed of synthetic or natural fibers or particles that are a byproduct of a cutting process, where these have been bound via a binder to give a molding. The moldings can have any desired form. Particular preference is given to MDF (medium-density fiberboard).

Conventional application processes can be used to coat the foils and substrates with the adhesive, an example being an application process using spraying, spreading, doctoring, stamping, rolling, or casting. Preference is given to spray application.

The amount of adhesive applied is preferably 0.5 to 100 $g/m^2$, particularly preferably 2 to 80 $g/m^2$, very particularly preferably 10 to 70 $g/m^2$, based on adhesive. It is preferable to coat only the foil or only the substrate on one side. However, it is also possible to coat both of the units to be adhesive-bonded, i.e. foil and substrate. The coating process is usually followed by a drying process, preferably at room temperature or temperatures up to 80° C., in order to remove water or other solvents.

The foil coated with the adhesive composition, or the coated substrate, can be stored prior to the adhesive-bonding process. Flexible foils can by way of example be wound up on rolls. For the adhesive-bonding process, the parts to be adhesive-bonded are brought together. The adhesive is activated thermally. The temperature in the adhesive layer is preferably at least 30° C. or at least 40° C., e.g. 30 to 200° C., or 40 to 180° C. A particular advantage of the invention consists in good capability of the adhesive for activation even at temperatures below the temperature range of 60-70° C. used with conventional adhesives, e.g. at temperatures below 60° C., e.g. at most 58° C., at most 55° C., or at most 50° C.

The adhesive-bonding process preferably takes place under pressure. To this end, by way of example, the components to be adhesive-bonded can be pressed together by a pressure of at least 0.005 $N/mm^2$, or at least 0.01 $N/mm^2$, or at least 0.08 $N/mm^2$, e.g. 0.005 to 5 $N/mm^2$, or 0.01 to 0.8 $N/mm^2$. The pressure applied can by way of example be generated via application of a subatmospheric pressure between foil and substrate, and/or via air pressure.

The composite products obtained feature high mechanical strength at temperatures including elevated temperatures (heat resistance), or when exposed to severe changes in climatic conditions (resistance to climatic conditions).

The process of the invention is particularly important for the production of MDF laminated to foils, in particular to decorative foils, for the front of furniture. A particular process used here is known as the 3D-press process. The adhesive components are mixed with one another and applied to the molding, e.g. MDF. A drying process then optionally takes place, e.g. at room temperature or in a drying tunnel at, for example, 40-50° C. The dried adhesive is thermally activated by means of the preheated foil, and is pressed onto the substrate, e.g. in vacuo and/or via air pressure.

The foils used here are frequently decorative plastics foils, and can have a surface structure. This surface structure can be impressed on the plastics foil by way of example prior to, during, or after the adhesive-bonding process.

It is not absolutely essential that the foil substrates undergo surface treatment prior to coating with a polymer dispersion of the invention. However, better results can be obtained if the surface of the foil substrates is modified prior to the coating process. Conventional surface treatments can be used here to increase adhesion, e.g. corona treatment. The extent of the corona treatment or of other surface treatments is that required for sufficient wettability with the coating composition. A corona treatment using about 10 watts per square meter and minute is usually adequate for this purpose. As an alternative, or in addition, it is optionally also possible to use primers or intermediate layers between foil substrate and adhesive coating and/or molding substrate. The foils can moreover have further, additional functional layers, e.g. barrier layers, print layers, color layers, or coating layers, or protective layers. The location of the functional layers here can be external, i.e. on that side of the foil substrate that faces away from the adhesive-coated side, or internal, between foil substrate and adhesive layer.

The process of the invention is also particularly important for the production of components for incorporation into vehicles. Particular preference is given to the use of the adhesive of the invention for the production of internal cladding components for automobiles. Examples of internal cladding components of this type are internal door cladding, instrument panels, dashboards, parcel shelves, ready-to-install roof systems, sliding roof systems, center consoles, gloveboxes, sun visors, columns, door handles and armrests, floor assemblies, loading-floor assemblies, and trunk assemblies, and also sleeping-cab walls and rear walls in vans and in trucks. The method here in particular uses a vacuum thermoforming process or a press lamination process in the sealing process. In the vacuum thermoforming process, the adhesive is applied to the molding. This is then optionally followed by air-drying, e.g. at room temperature or in a drying tunnel, preferably at at most 40° C. The foil to be applied by adhesion, e.g. a decorative foil made of material impermeable to air, is typically clamped so as to give an airtight seal within a frame. Below the foil there is a lower former onto which the molding is placed. The lower former and the molding are permeable to air, or have perforations. Below the equipment there is another airtight seal. When the air is sucked out from this apparatus, the atmospheric pressure acting on the surface of the foil then brings the foil into full contact with the molding, thus achieving precise fit. The foil is heated prior to application of the vacuum or subatmospheric pressure. The foil is impermeable to air because a vacuum or subatmospheric pressure is to be produced. In the press lamination process, the adhesive is likewise applied on the molding and optionally on the foil to be adhesive-bonded, but at least on the molding. This is then optionally followed by air-drying, typically at room temperature or in a drying tunnel, preferably at at most 40° C. The adhesive bonding of moldings to the foil takes place after thermal activation, the materials being brought together and pressed. The foils used here are frequently decorative plastics foils, with a surface structure. This surface structure can be impressed on the plastics foil by way of example prior to, during, or after the adhesive-bonding process.

It is an advantage of the invention that when the polyurethane dispersions to be used in the invention are used in the production of laminated moldings they not only provide better shear values in the contact adhesive-bonding process but also provide better heat resistance values and lower activation temperatures when they are used in thermal activation processes.

EXAMPLES

Inventive Example IE1

323.5 g (0.16 mol) of a polyesterol with OH number 55.5 derived from adipic acid/isophthalic acid and 1,6-hexanediol, 315.5 g (0.16 mol) of a polycarbonate based on hexanediol with OHN 56.9 (Eternacoll® UH 200), and 29.2 g (0.28 mol) of neopentyl glycol, and also 66 g of acetone, were used as initial charge in a stirred flask with reflux condenser and thermometer, and 0.1 g of tetrabutyl orthotitanate was admixed. After addition of 73.4 g (0.33 mol) of isophorone diisocyanate and 55.5 g (0.33 mol) of hexamethylene diisocyanate, the mixture is stirred for 210 min at an external temperature of 115° C. 1230 g of acetone were then used for dilution. The NCO content of the solution was determined as 0.407%. 37.3 g (0.09 mol) of an aqueous solution of Na (N-(2-aminoethyl)-2-aminoethyl sulfate were added to the mixture. After 10 minutes, 1200 g of water were used for dispersion. After distillation of the acetone, the product was an aqueous polyurethane dispersion with 36% solids content.

Inventive Example IE2

323.5 g (0.16 mol) of a polyesterol with OH number 55.5 derived from adipic acid/isophthalic acid and 1,6-hexanediol, 315.5 g (0.16 mol) of a polycarbonate based on hexanediol with OHN 56.9 (Eternacoll® UH 200), and 25.2 g (0.28 mol) of 1,4-butanediol, and also 66 g of acetone, were used as initial charge in a stirred flask with reflux condenser and thermometer, and 0.1 g of tetrabutyl orthotitanate was admixed. After addition of 73.4 g (0.33 mol) of isophorone diisocyanate and 55.5 g (0.33 mol) of hexamethylene diisocyanate, the mixture is stirred for 210 min at an external temperature of 115° C. 1230 g of acetone were then used for dilution. The NCO content of the solution was determined as 0.241%. 37.3 g (0.09 mol) of an aqueous solution of Na (N-(2-aminoethyl)-2-aminoethyl sulfate were added to the mixture. After 10 minutes, 1200 g of water were used for dispersion. After distillation of the acetone, the product was an aqueous polyurethane dispersion with 39.7% solids content.

Comparative Example CE1

Luphen® D200A: polyurethane dispersion based on a crystalline polyesterdiol with 40% solids content, for adhesive bonding in the thermal activation process.

Comparative Example CE2

Luphen® D259A: polyurethane dispersion based on an amorphous polyetherdiol with 40% solids content, for adhesive bonding in the contact process.

Test Method for "Heat Resistance" (HR, Edge Shrinkage)

35-45 g/m$^2$ (solid) of the adhesive composed of 100 parts of the polyurethane dispersion and of 12 parts (solid/solid) of the water-emulsifiable isocyanate crosslinking agent Basonat® F 200 WD were sprayed onto a fiber molding of the type used for the production of furniture moldings, with three-dimensional surface, and dried. A rigid PVC furniture foil (Roxan 5371744 Buche Taunus) was applied by lamination in a commercially available vacuum thermoforming press (Bürkle Thermoformer). The lamination was achieved at a hotplate temperature of 115° C. and at a pressure of 4.5 bar; the pressure was maintained for 45 seconds. The resultant activation temperature in the adhesive was about 55° C. The vacuum time was about 6 s. The laminated foil extends to the edge of the resultant molding.

The laminated product made of molding and foil was first stored at room temperature for 7 days. It was then stored at 75° C. to 90° C., where the storage temperature, beginning at 75° C., was increased by 5° C. every hour. After every hour, a lens with a scale was used at the edges of the molding to measure whether and to what extent the laminated foil had shrunk, i.e. the extent of movement in mm of the edge of the foil from the edge of the molding in the direction of the center of the test specimen. The smaller this value, the better the heat resistance. The temperature stated is that at which the edge shrinkage in the molding remains <0.3 mm.

Test Method for "Peel Value for Activation Temperature 50° C."

Peel force is studied as follows (peel test, peel resistance):

A rigid PVC furniture foil (Roxan 5371744 Buche Taunus) of width 5 cm was coated with 35-45 g/m$^2$ (solid) of the adhesive, dried, and pressed in a heatable laboratory press with a second, uncoated PVC strip at a temperature of 50° C. in the adhesive, for 30 seconds. The test under standard conditions of temperature and humidity is carried out in a tensile testing machine 1 min after the pressing process. Once the prescribed waiting time has expired, the test strip is peeled as far as halfway, starting from the lower edge, and turned upward at an angle of 180°. The test substrate end that is now free is clamped into the tensile testing machine, and the test strip is peeled at an angle of 180 degrees, the velocity of the machine being 300 mm/minute. The test substrate is renewed after each measurement. At least 3 individual measurements are made. The test results are stated in N/5 cm width.

Test Method for "Contact Adhesive Bonding"

An area of 20×40 mm of two flat beechwood test specimens of width 40 mm is coated with in each case 35-45 g/m$^2$ (solid) of the adhesive, and dried. After one hour, the adhesive layers are pressed for 30 seconds at 23° C. under a pressure of 0.5 N/mm$^2$. The shear resistance of the adhesive bond is then determined in N at 23° C. in a machine for testing ultimate tensile strength.

TABLE 1

| | Test results | | |
|---|---|---|---|
| Example | Shear value for contact adhesive bonding [N] | Peel value[1] [N/5 cm] | Edge shrinkage < 0.3 mm [° C.] |
| CE2 | 940 | not measurable | 85 |
| CE1 | no adhesive bonding | 34 | 90 |
| IE2 | 1338 | 23 | >95 |
| IE1 | 1811 | 34 | 95 |

[1]at 23° C., after thermal activation at 50° C.

The results in table 1 show that the dispersions IE1 and IE2 of the invention can be used advantageously in the thermal activation process because they can be thermally activated by comparatively low temperatures and at the same time generate sufficiently high peel resistance at room temperature (peel value) and also high heat resistance of the adhesive bond (edge shrinkage). Materials coated with the dispersions of the invention can moreover be adhesive-bonded by the contact process at room temperature to give high adhesive bond strengths.

The invention claimed is:

1. A method for producing a laminated molding, the method comprising:
    applying at least one aqueous polyurethane dispersion comprising at least one polyurethane to at least one of a foil and a molding, and
    laminating the foil to the molding,
    wherein the polyurethane consists essentially of at least one unit derived from an amorphous polyester polyol, at least one unit derived from a polycarbonate, and at least one organic diisocyanate or a mixture which comprises an organic isocyanate compound; and
    wherein the amorphous polyester polyol comprises reacted units of an aliphatic dicarboxylic acid having from 3 to 10 carbon atoms and an aromatic dicarboxylic acid in a molar ratio of from 0.5:1 to 2:1.

2. The method according to claim 1, wherein the amorphous polyester polyol does not have a melting point of from −30° C. to +60° C.

3. The method according to claim 1, wherein the
    at least one amorphous polyesterdiol has a molar mass of above 500 to 4000 g/mol,
    the at least one polycarbonate has a molar mass of above 500 to 4000 g/mol, and
    the at least one organic diisocyanate or the mixture which comprises an organic isocyanate compound having an arithmetic-average NCO functionality of from 1.9 to 2.3.

4. The method according to claim 1, wherein the polyurethane comprises at least 10% by weight of units of the amorphous polyester polyol and at least 10% by weight of units of the polycarbonate.

5. The method according to claim 1, wherein the polycarbonate is a hydroxy-terminated polycarbonate based on at least one alkanediol comprising from 2 to 10 carbon atoms.

6. The method according to claim 1, wherein the amorphous polyester polyol comprises
    an alkanediol comprising from 2 to 10 carbon atoms.

7. The method according to claim 6, wherein the amorphous polyester polyol comprises adipic acid/isophthalic acid and an alkanediol comprising from 4 to 8 carbon atoms.

8. The method according to claim 1, wherein the polyurethane comprises from 2 to 10% by weight of at least one dihydric alcohol with an average molar mass of from 62 to 500 g/mol.

9. The method according to claim 1, wherein the at least one organic diisocyanate is selected from the group consisting of isophorone diisocyanate, hexamethylene diisocyanate, and a mixture of isophorone diisocyanate and hexamethylene diisocyanate.

10. The method according to claim 1, wherein a quotient calculated from an entirety of all NCO groups and from an entirety of all NCO-reactive OH groups is from 0.7 to 1.5.

11. The method according to claim 1, wherein a molar ratio of the polyester polyol to the polycarbonate is from 1:10 to 10:1.

12. The method according to claim 1, wherein the
    at least one amorphous polyesterdiol with a molar mass of above 500 to 4000 g/mol is present in the polyurethane in an amount of 10 to 80% by weight,
    the at least one polycarbonate with a molar mass of above 500 to 4000 g/mol is present in the polyurethane in an amount of 10 to 80% by weight, and
    the at least one organic diisocyanate or one mixture which comprises an organic isocyanate compound and which has an arithmetic-average NCO functionality of from 1.9 to 2.3 is present in the polyurethane in an amount of 5 to 30% by weight, and
    the polyurethane further consists essentially of 2 to 10% by weight of at least one dihydric alcohol with an average molar mass of from 62 to 500 g/mol.

13. The method according to claim 1, wherein the polyurethane dispersion is in a form of two-component adhesive composition together with at least one polyisocyanate compound.

14. The method according to claim 1, wherein the polyurethane dispersion is blended with at least one further polymer dispersion to obtain a blend dispersion,
    wherein
    the further polymer dispersion is at least one selected from the group consisting of a polyacrylate dispersion, a polyvinyl acetate dispersion, and a polyethylene-vinyl acetate dispersion, and
    a quantitative ratio by weight of the polyurethane dispersion to the blend dispersion is optionally from 3:1 to 1:2, based in each case on solids content.

15. The method according to claim 1, wherein the polycarbonate is a hydroxy-terminated polycarbonate comprising reacted units of at least one alkanediol comprising from 4 to 8 carbon atoms.

16. The method according to claim 1, wherein the polycarbonate is a hydroxy-terminated polycarbonate comprising reacted units of 1,6-hexanediol.

17. The method according to claim 1, wherein the amorphous polyester polyol is
    a mixture of at least one aliphatic dicarboxylic acid comprising from 4 to 8 carbon atoms and an alkanediol comprising from 4 to 8 carbon atoms.

18. The method according to claim 1, wherein the amorphous polyester polyol has units of adipic acid/isophthalic acid and units of an alkanediol comprising from 4 to 8 carbon atoms.

19. The method according to claim 1, wherein the amorphous polyester polyol has units of 1,6-hexanediol.

20. The method according to claim 1, wherein the applying includes depositing an amount of from 10 to 70 g/m$^2$ of the aqueous polyurethane dispersion onto at least one of the foil and the molding and the laminating is carried out under a pressure of at least 0.01 N/mm$^2$ to form a laminate, and
    the process further comprises:
    heating the laminate to dry the aqueous polyurethane dispersion and form a dried adhesive, and
    thermally activating the dried adhesive at a temperature of less than 60° C. to form the laminated molding.

21. The method according to claim 1, wherein the polyurethane further consists essentially of one or more selected from the group consisting of
    d) at least one dihydric alcohol,
    e) at least one compound selected from the group consisting of a mono- to trihydric alcohol which comprises an ionic group or a group capable of conversion to an ionic group, and a diamino compound which comprises an ionic group or a group capable of conversion to an ionic group, f) at least one further polyfunctional compound which differs from compounds (a) to (e) and which comprises an alcoholic hydroxy group, a primary or secondary amino group, or an isocyanate group, and g) at least one monofunctional compound which differs from compounds (a) to (f) and which comprises an alcoholic hydroxy group, a primary or secondary amino group, or an isocyanate group.

22. A foil-laminated molding obtained by the method according to claim 1.

23. The foil-laminated molding according to claim 22, wherein the foil is at least one material selected from the group consisting of polyvinyl chloride and thermoplastic polyolefin.

* * * * *